United States Patent
Puckett et al.

(10) Patent No.: US 11,630,123 B2
(45) Date of Patent: Apr. 18, 2023

(54) OPTO-MECHANICAL RESONATOR WITH TWO OR MORE FREQUENCY MODES

(71) Applicant: Honeywell International Inc., Charlotte, NC (US)

(72) Inventors: Matthew Puckett, Phoenix, AZ (US); Jianfeng Wu, Tucson, AZ (US); Neil Krueger, Saint Paul, MN (US); Steven Tin, Plymouth, MN (US)

(73) Assignee: Honeywell International Inc., Charlotte, NC (US)

( * ) Notice: Subject to any disclaimer, the term of this patent is extended or adjusted under 35 U.S.C. 154(b) by 156 days.

(21) Appl. No.: 16/996,366

(22) Filed: Aug. 18, 2020

(65) Prior Publication Data

US 2022/0057427 A1 Feb. 24, 2022

(51) Int. Cl.
*G01P 15/093* (2006.01)
*G01P 15/097* (2006.01)

(52) U.S. Cl.
CPC .......... *G01P 15/093* (2013.01); *G01P 15/097* (2013.01)

(58) Field of Classification Search
CPC ....... G01P 15/093; G01P 15/097; G01H 9/00; G01H 13/00
See application file for complete search history.

(56) References Cited

U.S. PATENT DOCUMENTS

| | | | |
|---|---|---|---|
| 5,599,358 A | 2/1997 | Giavazzi et al. | |
| 7,206,265 B2 | 4/2007 | Kuo et al. | |
| 7,355,723 B2 | 4/2008 | Carr | |
| 8,318,524 B2 | 11/2012 | Perez et al. | |
| 8,879,067 B2 | 11/2014 | Higgins et al. | |
| 9,069,004 B2 | 6/2015 | Bhave et al. | |

(Continued)

FOREIGN PATENT DOCUMENTS

| EP | 3112879 A1 | 1/2017 |
|---|---|---|
| WO | 2019/234416 A1 | 12/2019 |

OTHER PUBLICATIONS

Response to Extended Search Report dated Jan. 5, 2022, from counterpart European Application No. 21189745.9, filed Feb. 8, 2022, 44 pp.

(Continued)

*Primary Examiner* — Xin Y Zhong
(74) *Attorney, Agent, or Firm* — Shumaker & Sieffert, P.A.

(57) ABSTRACT

This disclosure is related to devices, systems, and techniques for determining an acceleration. For example, an accelerometer system includes a resonator and a light-emitting device configured to generate, based on an error signal, an optical signal. Additionally, the accelerometer includes a modulator configured to receive the optical signal, generate a modulated optical signal responsive to receiving the optical signal, and output the modulated optical signal to the resonator. A photoreceiver receives a passed optical signal from the resonator, where the passed optical signal indicates a resonance frequency of the resonator. Additionally, the photoreceiver receives a reflected optical signal from the resonator. The photoreceiver generates one or more electrical signals based on the passed optical signal and the reflected optical signal. Processing circuitry generates the error signal and determines the acceleration based on the one or more electrical signals.

17 Claims, 5 Drawing Sheets

(56) References Cited

U.S. PATENT DOCUMENTS

| | | | |
|---|---|---|---|
| 9,285,391 B2 | 3/2016 | Hutchinson et al. | |
| 9,618,531 B2 | 4/2017 | Painter et al. | |
| 9,874,581 B2 | 1/2018 | Tin et al. | |
| 9,927,458 B2 | 3/2018 | Bramhavar et al. | |
| 9,983,225 B2 | 5/2018 | Fertig et al. | |
| 10,416,003 B2 | 9/2019 | Leoncino et al. | |
| 10,488,429 B2 | 11/2019 | Zotov et al. | |
| 10,502,757 B2 | 12/2019 | Bramhavar et al. | |
| 10,705,112 B1 | 7/2020 | Dorr et al. | |
| 2004/0046111 A1 | 3/2004 | Swierkowski | |
| 2010/0046002 A1 | 2/2010 | Perez et al. | |
| 2011/0234206 A1* | 9/2011 | Kawakubo | G01P 15/18 |
| | | | 324/162 |
| 2015/0098088 A1* | 4/2015 | Qiu | G01C 19/727 |
| | | | 356/461 |
| 2015/0168441 A1* | 6/2015 | Hutchison | G01P 15/093 |
| | | | 356/460 |
| 2016/0377647 A1* | 12/2016 | Fertig | G01P 21/00 |
| | | | 73/1.38 |
| 2018/0128850 A1 | 5/2018 | Bramhavar et al. | |

OTHER PUBLICATIONS

Extended Search Report from counterpart European Application No. 21189745.9 dated Jan. 5, 2022, 9 pp.

Krause et al., "A microchip optomechanical accelerometer," California Institute of Technology, Pasadena, California, accessed from https://arxiv.org/pdf/1203.5730.pdf, Mar. 27, 2012, 16 pp.

Notice of Intent to Grant and Text Intended to Grant from counterpart European Application No. 21189745.9, dated Sep. 14, 2022, 41 pp.

\* cited by examiner

OPTO-MECHANICAL RESONATOR WITH TWO OR MORE FREQUENCY MODES

TECHNICAL FIELD

This disclosure relates to accelerometers.

BACKGROUND

Accelerometers function by detecting a displacement of a proof mass under inertial forces. In one example, an accelerometer may detect the displacement of a proof mass by the change in frequency of a resonator connected between the proof mass and a support base. A resonator may be designed to change frequency proportional to the load applied to the resonator by the proof mass under acceleration. The resonator may be electrically coupled to oscillator circuitry, or other signal generation circuitry, which causes the resonator to vibrate at a resonance frequency.

SUMMARY

In general, the disclosure is directed to devices, systems, and techniques for determining an acceleration of one or more devices. For example, a vibrating beam accelerometer (VBA) described herein may measure one or more resonance frequencies of a resonator and calculate, based on the respective resonance frequencies, an acceleration of the VBA. In some cases, one or more light-emitting devices may generate optical signals and output these optical signals to the resonator, inducing a mechanical vibration in the resonator. For example, a first light-emitting device may emit a first optical signal to a first end the resonator and a second light-emitting device may emit a second optical signal to a second end of the resonator. The resonator passes a first portion of the first optical signal and reflects a second portion of the first optical signal. Additionally, the resonator passes a first portion of the second optical signal and reflects a second portion of the second optical signal.

After the resonator passes the first portion of the first optical signal, the first portion of the first optical signal may include information indicative of a first resonance frequency of the resonator. Additionally, after the resonator passes the first portion of the second optical signal, the first portion of the second optical signal may include information indicative of a second optical signal of the resonator. A photodiode may receive the first portion of the first optical signal and the first portion of the second optical signal and generate an electrical signal which indicates a difference between the first resonance frequency and the second resonance frequency. This frequency difference is correlated with the acceleration of the VBA.

In some examples, an accelerometer system includes a resonator and a light-emitting device configured to generate, based on an error signal, an optical signal. Additionally, the accelerometer includes a modulator configured to receive the optical signal, generate a modulated optical signal responsive to receiving the optical signal, and output the modulated optical signal to the resonator. The accelerometer system includes a photoreceiver configured to receive a passed optical signal from the resonator, wherein the passed optical signal represents a portion of the modulated optical signal which passes through the resonator, the passed optical signal indicating a resonance frequency of the resonator, receive a reflected optical signal from the resonator, wherein the reflected optical signal represents a portion of the modulated optical signal which is reflected by the resonator, and generate one or more electrical signals based on the passed optical signal and the reflected optical signal. Additionally, the accelerometer system includes processing circuitry configured to generate the error signal based on one or more parameters of the reflected optical signal which are indicated by the one or more electrical signals and determine the acceleration based on the resonance frequency which is indicated by the one or more electrical signals.

In some examples, a method includes generating, by a light-emitting device based on an error signal, an optical signal, receiving, by a modulator, the optical signal, generating, by the modulator, a modulated optical signal responsive to receiving the optical signal, and outputting, by the modulator, the modulated optical signal to a resonator. Additionally, the method includes receiving, by a photoreceiver, a passed optical signal from the resonator, wherein the passed optical signal represents a portion of the modulated optical signal which passes through the resonator, the passed optical signal indicating a resonance frequency of the resonator, receiving, by the photoreceiver, a reflected optical signal from the resonator, wherein the reflected optical signal represents a portion of the modulated optical signal which is reflected by the resonator, and generating, by the photoreceiver, one or more electrical signals based on the passed optical signal and the reflected optical signal. Additionally, the method includes generating, by processing circuitry, the error signal based on one or more parameters of the reflected optical signal which are indicated by the one or more electrical signals, and determining, by the processing circuitry, the acceleration based on the resonance frequency which is indicated by the one or more electrical signals.

In some examples a resonator includes a mechanical beam extending along a longitudinal axis from a first end to a second end, wherein the mechanical beam includes a first oscillating surface which extends along the longitudinal axis from the first end to the second end and a second oscillating surface opposite the first oscillating surface, where the second oscillating surface extends along the longitudinal axis from the first end to the second end. The first oscillating surface causes the resonator to vibrate at a first resonance frequency responsive to the mechanical beam receiving a first modulated optical signal. The second oscillating surface causes the resonator to vibrate at a second resonance frequency responsive to receiving a second modulated optical signal.

The summary is intended to provide an overview of the subject matter described in this disclosure. It is not intended to provide an exclusive or exhaustive explanation of the systems, device, and methods described in detail within the accompanying drawings and description below. Further details of one or more examples of this disclosure are set forth in the accompanying drawings and in the description below. Other features, objects, and advantages will be apparent from the description and drawings, and from the claims.

BRIEF DESCRIPTION OF DRAWINGS

Like reference characters denote like elements throughout the description and figures.

DETAILED DESCRIPTION

Figure 1:
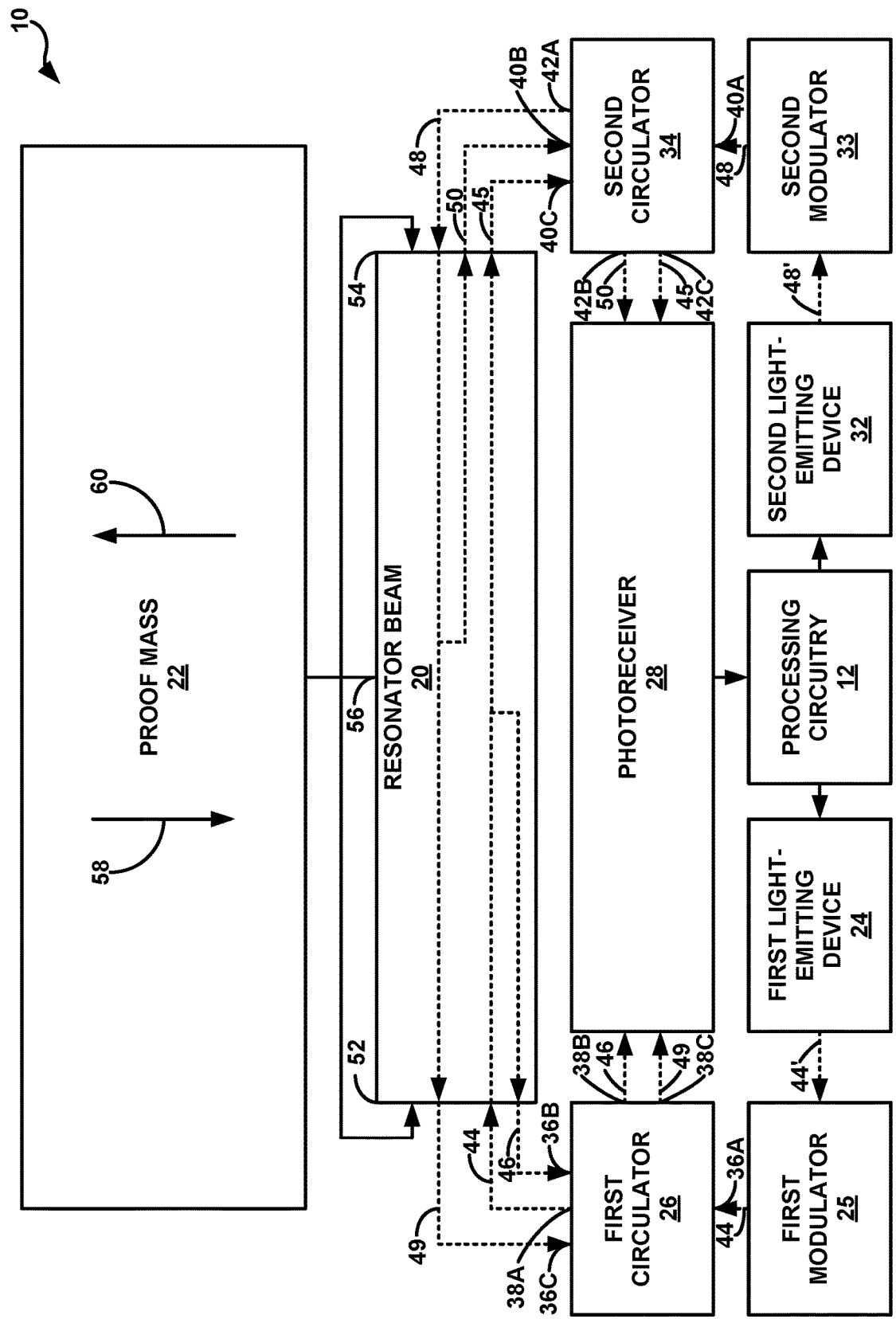
FIG. 1 is a block diagram illustrating an accelerometer system, in accordance with one or more techniques of this disclosure.

This disclosure is directed to devices, systems and techniques for determining an acceleration of a vibrating beam accelerometer (VBA). For example, the disclosure is directed to a VBA with a proof mass, a base section, and a resonator beam. The resonator beam may be configured to receive a first optical signal and a second optical signal, which induce the resonator to vibrate at a first resonance frequency and a second resonance frequency, respectively. The respective magnitudes of resonance frequencies of the resonator beam may indicate the acceleration of the VBA. That is, the first resonance frequency and the second resonance frequency may change based on the acceleration of the VBA and it may be possible to determine the acceleration of the VBA based on the first resonance frequency and the second resonance frequency.

In some examples, a first negative feedback loop may control a first light-emitting device to emit the first optical signal at the first resonance frequency and a second negative feedback loop control a second light-emitting device to emit the second optical signal at the second resonance frequency. For example, the resonator may pass a first portion of the first optical signal and reflect a second portion of the first optical signal. Additionally, the resonator may pass a first portion of the second optical signal and reflect a second portion of the second optical signal. The first portion of the first optical signal may represent a portion of the first optical signal representing the first resonance frequency and the first portion of the second optical signal may represent the portion of the second resonance frequency representing the second resonance frequency. The reflected portions of the first optical signal and the second optical signals, on the other hand, may represent portions that do not represent the first resonance frequency and the second resonance frequency, respectively. As such, the processing circuitry may generate a first error signal to adjust the first optical signal emitted by the first light-emitting device in order to eliminate frequencies other than the first resonance frequency and the processing circuitry may generate a second error signal to adjust the second optical signal emitted by the second light-emitting device in order to eliminate frequencies outside of the second resonance frequency A photoreceiver (e.g., a photodiode) may receive the first portion of the first optical signal, the second portion of the first optical signal, the first portion of the second optical signal, and the second portion of the second optical signal. The photoreceiver may generate one or more electrical signals which represent the optical signals received by the photoreceiver and output the one or more electrical signals to the processing circuitry. The processing circuitry may generate the first error signal based on the first portion of the first optical signal and generate the second error signal based on a first portion of the second optical signal. The processing circuitry may output the first error signal to the first light-emitting device in order to regulate the first optical signal to represent the first resonance frequency and the processing circuitry may output the second error signal to the second light-emitting device in order to regulate the second optical signal to represent the second resonance frequency.

The processing may determine the acceleration of the VBA based on the first resonance frequency indicated by the first portion of the first optical signal and the second resonance frequency indicated by the first portion of the second optical signal. For example, a relationship may exist between a difference between a magnitude of the first resonance frequency of the resonator and a magnitude of the second resonance frequency of the resonator and the acceleration of the VBA. As such, the processing circuitry may calculate the acceleration of the VBA based on a difference between the first and second resonance frequencies of the resonator.

The techniques of this disclosure may provide one or more advantages. For example, readout signals of some accelerometers may be compromised by environmental factors such as temperature. It may be the case that a sole resonance frequency component of a resonator is affected by a temperature of an environment proximate to the VBA, thus affecting an acceleration which is measured based on one resonance frequency of one light mode. One or more techniques of this disclosure include determining an acceleration of a VBA based on a difference between two or more resonance frequencies, each resonance frequency of the two or more resonance frequencies corresponding to a different light mode. Environmental factors may affect each resonance frequency of the two or more resonance frequencies by substantially the same amount, thus eliminating an impact of the environmental factors on the measured acceleration. For example, when acceleration is measured based on a difference between a first resonance frequency and a second resonance frequency, a change in temperature may cause both of the first resonance frequency and the second resonance frequency to change by the same amount while acceleration remains constant. In this way, the difference between the first resonance frequency and the second resonance frequency remains the same, which means that the measured acceleration remains the same.

FIG. 1 is a block diagram illustrating an accelerometer system 10, in accordance with one or more techniques of this disclosure. As illustrated in FIG. 1, accelerometer system 10 includes processing circuitry 12, resonator beam 20, proof mass 22, first light-emitting device 24, first modulator 25, first circulator 26, photoreceiver 28, second light-emitting device 32, second modulator, and second circulator 34.

Accelerometer system 10 is configured to determine an acceleration based on two or more measured resonance frequencies of resonator beam 20, which is mechanically connected to proof mass 22. For example, proof mass 22 may be capable of applying one or both of a compression force and a tension force to resonator beam 20, affecting the two or more resonance frequencies used to determine the acceleration. For example, as proof mass 22 changes a force applied to resonator beam 20, a first resonance frequency and a second resonance frequency may each change based on the change a magnitude of the force applied to resonator beam 20 by proof mass 22, where the change in the magnitude of the force is correlated with a change in the acceleration of accelerometer system 10. In some examples, accelerometer system 10 may calculate the acceleration based on the difference between the first resonance frequency mode and the second resonance frequency mode.

Processing circuitry 12 may include one or more processors that are configured to implement functionality and/or process instructions for execution within accelerometer system 10. For example, processing circuitry 12 may be capable of processing instructions stored in a memory. Processing circuitry 12 may include, for example, microprocessors, digital signal processors (DSPs), application specific integrated circuits (ASICs), field-programmable gate arrays (FPGAs), or equivalent discrete or integrated logic circuitry, or a combination of any of the foregoing devices or circuitry. Accordingly, processing circuitry 12 may include any suitable structure, whether in hardware, software, firmware, or any combination thereof, to perform the functions ascribed herein to processing circuitry 12.

A memory (not illustrated in FIG. 1) may be configured to store information within accelerometer system 10 during operation. The memory may include a computer-readable storage medium or computer-readable storage device. In some examples, the memory includes one or more of a short-term memory or a long-term memory. The memory may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, the memory is used to store program instructions for execution by processing circuitry 12.

Resonator beam 20 may represent a mechanical beam which is located between proof mass 22 and a base section (not illustrated in FIG. 1). Proof mass 22, in some cases, may apply a tension force to resonator beam 20 or apply a compression force to resonator beam 20. In some examples, resonator beam may be configured to mechanically vibrate according to two or more resonance frequencies, When proof mass 22 applies a tension force to resonator beam 20 in response to an acceleration in a first direction 58, the tension force may "pull" on first end 52 and second end 54 of resonator beam 20 and a magnitude of each resonance frequency of the one or more resonance frequencies may change by a predetermined amount corresponding to a magnitude of the tension force. Alternatively, when proof mass 22 applies a compression force to resonator beam 20 in response to an acceleration in a second direction 60, the compression force may "push" on first end 52 and second end 54 of resonator beam 20 and the magnitude of each resonance frequency of the two or more resonance frequencies may change by a predetermined amount corresponding to a magnitude of the compression force.

In this way, tension forces and compression forces applied to resonator beam 20 responsive to acceleration in the first direction 58 and the second direction 60, respectively, may affect characteristics (e.g., magnitude) of the two or more resonance frequencies by which resonator beam 20 vibrates. Measuring the magnitude and the sign (e.g., positive or negative) of each resonance frequency of the two or more resonance frequencies may allow processing circuitry 12 to determine a magnitude and a sign of the acceleration of accelerometer system 10. For example, processing circuitry 12 may determine the acceleration based on one or more electrical signals generated by photoreceiver 28, which indicate the difference between a first resonance frequency of resonator 20 and a second resonance frequency of resonator 20.

First light-emitting device 24 and second light-emitting device 32 (collectively, "light-emitting devices 24, 32") may, in some cases, include one or more laser devices configured to emit photons. In some examples, light-emitting devices 24, 32 emit photons at an optical power within a range between 0.1 microwatts (μW) and 10 μW. In some examples, first light-emitting device 24 is a first semiconductor laser which includes a first laser diode and second light-emitting device 32 is a second semiconductor laser which includes a second laser diode. First light-emitting device 24 may generate a first optical signal 44' based on a first error signal received from processing circuitry 12. Second light-emitting device 32 may generate a second optical signal 48' based on a second error signal received from processing circuitry 12.

First modulator 25 and second modulator 33 (collectively, "modulators 25, 33") may modulate optical signals emitted by the first light-emitting device 24 and the second light-emitting device 32, respectively. First modulator 25, for example, may receive first optical signal 44' from first light-emitting device 24 while first modulator 25 also receives a first modulator control signal from a first control unit (not illustrated in FIG. 1) which regulates a manner in which first modulator 25 modulates the first optical signal. First modulator 25, in some cases, may transmit a modulated first optical signal 44 to first circulator 26. Additionally, second modulator 33 may receive second optical signal 48' from second light-emitting device 32 while second modulator 33 also receives a second modulator control signal from a second control unit (not illustrated in FIG. 1) which regulates a manner in which second modulator 33 modulates the second optical signal. Second modulator 33, in some cases, may transmit a modulated second optical signal 48 to second circulator 34.

First circulator 26 and second circulator 34 (collectively, "circulators 26, 34") may represent optical devices configured to receive optical signals via one or more optical inputs and output optical signals via one or more optical outputs. For example, first circulator 26 includes first optical inputs 36A-36C (collectively, "first optical inputs 36") and first circulator 26 also includes first optical outputs 38A-38C (collectively, "first optical outputs 38"). Second circulator 34 includes second optical inputs 40A-40C (collectively, "second optical inputs 40") and second circulator 34 also includes second optical outputs 42A-42C (collectively, "optical outputs 42").

First light-emitting device 24 generates a first optical signal 44' and outputs the first optical signal 44' to first modulator 25. First modulator 25 modulates the first optical signal 44' in order to generate a modulated first optical signal 44. In some examples, first modulator 25 receives a first modulator control signal which causes first modulator 25 to generate modulated first optical signal 44 according to a first light mode. First modulator 25 outputs the modulated first optical signal 44 to first circulator 26 via optical input 36A. First circulator 26 may direct modulated first optical signal 44 to a first end 52 of resonator beam 20 via optical output 38A. The modulated first optical signal 44 may travel through resonator beam 20 to a position proximate a center 56 of resonator beam 20. In some examples, modulated first optical signal 44 may include a range of optical frequencies. Resonator beam 20 may reflect some optical frequencies of modulated first optical signal 44 and allow some optical frequencies of modulated first optical signal 44 to pass through the length of resonator beam 20 from first end 52 to second end 54.

Resonator beam 20 may reflect a first portion of modulated first optical signal 44 and allow a second portion of modulated first optical signal 44 to pass through resonator beam 20 from the first end 52 to the second end 54. The second portion of modulated first optical signal 44 which exits the second end 54 of resonator beam 20 may represent a "passed" first optical signal 45. Resonator beam 20 may reverse a direction of the first portion of the modulated first optical signal 44 which is reflected, causing the first portion of the modulated first optical signal 44 to exit at the first end 52 of resonator beam 20. As such, the optical signal exiting the first end 52 of resonator beam 20 may represent a "reflected" first optical signal 46. In some examples, the first portion of modulated first optical signal 44 includes one or more bands of frequencies and the second portion of modulated first optical signal 44 represents a narrow band of frequencies which indicate a first resonance frequency of resonator beam 20.

The first lighting mode of the modulated first optical signal 44 may, in some cases, represent a Transverse Electric (TE) lighting mode. Light which propagates according to the TE lighting mode may be referred to herein as "TE Light." TE light represents light which does not induce an electric field in a direction of propagation and does induce a magnetic field in the direction of propagation. For example, as modulated first optical signal 44 propagates from the first end 52 of resonator beam 20 towards the center 56 of resonator beam 20, modulated first optical signal 44 induces a magnetic field in a horizontal direction (e.g., the direction along resonator beam 20 from the first end 52 to the second end 54) relative to resonator beam 20 and does not induce an electric field in the horizontal direction. The TE light of modulated first optical signal 44 may cause resonator beam 20 to vibrate mechanically at a first resonance frequency which corresponds to the TE lighting mode. The passed first optical signal 45 may, in turn, indicate the first resonance frequency of resonator beam 20. First circulator 26 may receive the reflected first optical signal 46 via optical input 36B. Then, first circulator 26 outputs the reflected first optical signal 46 to photoreceiver 48 via optical output 38B.

Second light-emitting device 32 generates a second optical signal 48' and outputs the second optical signal 48' to second modulator 33. Second modulator 33 modulates the second optical signal 48' in order to generate a modulated second optical signal 48. In some examples, second modulator 33 receives a second modulator control signal which causes second modulator 33 to generate modulated second optical signal 48 according to a second light mode. Second modulator 33 outputs the modulated second optical signal 48 to second circulator 34 via optical input 40A. Second circulator 34 may direct modulated second optical signal 48 to the second end 54 of resonator beam 20 via optical output 42A. The modulated second optical signal 48 may travel through resonator beam 20 to a position proximate a center 56 of resonator beam 20. In some examples, modulated second optical signal 48 may include a range of optical frequencies. Resonator beam 20 may reflect some optical frequencies of modulated second optical signal 48 and allow some optical frequencies of modulated second optical signal 48 to pass through the length of resonator beam 20 from second end 54 to first end 52.

Resonator beam 20 may reflect a first portion of modulated second optical signal 48 and allow a second portion of modulated second optical signal 48 to pass through resonator beam 20 from the second end 54 to the first end 52. The second portion of modulated second optical signal 48 which exits the first end 52 of resonator beam 20 may represent a "passed" second optical signal 49. Resonator beam 20 may reverse a direction of the first portion of the modulated second optical signal 48 which is reflected, causing the first portion of the modulated second optical signal 48 to exit at the second end 54 of resonator beam 20. As such, the optical signal exiting the second end 54 of resonator beam 20 may represent a "reflected" second optical signal 50. In some examples, the first portion of modulated second optical signal 48 includes one or more bands of frequencies and the second portion of modulated second optical signal 48 represents a narrow band of frequencies which indicate a second resonance frequency of resonator beam 20.

The second lighting mode of the modulated second optical signal 48 may, in some cases, represent a Transverse Magnetic (TM) lighting mode. Light which propagates according to the TM lighting mode may be referred to herein as "TM Light." TM light represents light which does not induce a magnetic field in a direction of propagation and does induce an electric field in the direction of propagation. For example, as modulated second optical signal 48 propagates from the second end 54 of resonator beam 20 towards the center 56 of resonator beam 20, modulated second optical signal 48 induces an electrical field in a horizontal direction (e.g., the direction along resonator beam 20 from the second end 54 to the first end 52) relative to resonator beam 20 and does not induce a magnetic field in the horizontal direction. The TM light of modulated second optical signal 48 may cause resonator beam 20 to vibrate mechanically at a second resonance frequency which corresponds to the TM lighting mode. The passed second optical signal 49 may, in turn, indicate the second resonance frequency of resonator beam 20. Second circulator 34 may receive the reflected second optical signal 50 via optical input 40B. Then, second circulator 34 outputs the reflected second optical signal 50 to photoreceiver 48 via optical output 42B.

First circulator 26 may receive passed second optical signal 49 via optical input 36C and forward passed second optical signal 49 to photoreceiver 28 via optical output 38C. Second circulator 33 may receive passed first optical signal 45 via optical input 40C and forward passed first optical signal 45 to photoreceiver 28 via optical output 42C. Although modulated first optical signal 44 is described herein as including TE light and modulated second optical signal 48 is described herein as including TM light, this is not required. In some examples, modulated first optical signal 44 includes TM light and modulated second optical signal 48 may include TE light. In some examples, first optical signal 44 and second optical signal 48 may include one or more other types of light which cause resonator beam 20 to mechanically vibrate according to two different modes.

In general, photoreceiver 28 may include one or more transistors configured to absorb photons of one or more optical signals and output, in response to absorbing the photons, an electrical signal. In this manner, photoreceiver 28 may be configured to convert optical signals into electrical signals. Photoreceiver 20 receives the passed first optical signal 45, the reflected first optical signal 46, the passed second optical signal 49, and the reflected second optical signal 50. Photoreceiver 28, for example, may include one or more p-n junctions that convert the photons of one or more optical signals into corresponding electrical signals.

For example, photoreceiver 28 may generate a first electrical signal component based on the passed first optical signal 45 and generate a second electrical signal component based on the passed second optical signal 49. The first electrical signal component may preserve at least some of the parameters of passed first optical signal 45 and the second electrical signal component may preserve at least some of the parameters of passed second optical signal 49. For example, the first electrical signal component may indicate the first resonance frequency (e.g., the TE resonance frequency) which is indicated by the passed first optical signal 45. The second electrical signal component may indicate the second resonance frequency (e.g., the TM resonance frequency) which is indicated by the passed second optical signal 49.

One or more frequency values and intensity values associated with passed first optical signal 45 and passed second optical signal 49 may be indicated by the first electrical signal component and the second electrical signal component, respectively. For example, photoreceiver 28 may produce a stronger electrical signal (i.e., greater current magnitude) in response to receiving a stronger (e.g., greater power) optical signal. Photoreceiver 28 may include semiconductor materials such as any one or combination of Indium Gallium Arsenide, Silicon, Silicon Carbide, Silicon Nitride, Gallium Nitride, Germanium, or Lead Sulphide.

A difference between the TE resonance frequency and the TM resonance frequency might, in some cases, be correlated with an acceleration of accelerometer system 10. For example, a first difference between the TE resonance frequency and the TM resonance frequency may represent a first acceleration and a second difference between the TE resonance frequency, and the TM resonance frequency may represent a second acceleration. When the first difference is greater than the second difference, the first acceleration may be greater than the second acceleration. Alternatively, when the first difference is less than the second difference, the first acceleration may be less than the second acceleration.

There may be a substantially linear relationship between the difference between the TE resonance frequency and the TM resonance frequency and the acceleration of accelerometer system 10, but this is not required. For example, the relationship between the difference and the acceleration may be modelled by an equation that is nearly linear but includes one or more quadratic coefficients introducing slight non-linear irregularities. In any case, processing circuitry 12 may be configured to apply the relationship in order to calculate the acceleration of accelerometer system 10 based on the difference between the TE resonance frequency and the TM resonance frequency indicated by the electrical signal.

It may be more beneficial to determine the acceleration of accelerometer system 10 based on the difference between the TE resonance frequency and the TM resonance frequency as compared with accelerometer systems which determine acceleration based solely on a measured resonance frequency value. For example, the difference between TE resonance frequency and the TM resonance frequency is a difference between two frequency values and does not represent a single frequency magnitude value. In some examples, environmental factors such as a temperature in an area proximate to the accelerometer system 10 may affect the TE resonance frequency and the TM resonance frequency by the same or similar factors, meaning that the difference between the TE resonance frequency and the TM resonance frequency is not substantially affected by these environmental factors, which is beneficial.

Additionally, it may be beneficial for the TE resonance frequency and the TM resonance frequency to not be the same while the acceleration of accelerometer system 10 is zero. For example, it may be easier to determine a difference between a positive acceleration of accelerometer system 10 and a negative acceleration of accelerometer system 10 when a difference between the TE resonance frequency and the TM resonance frequency is not the same while the acceleration of accelerometer system 10 is zero.

In some examples, processing circuitry 12 is configured to generate a first error signal for output to first light-emitting device 24. In some examples, processing circuitry 12 generates the first error signal in order to cause first light-emitting device 24 to generate first optical signal 44' to include one or more frequency components corresponding to the first resonance frequency of resonator 20. Resonator 20 may reflect any portions of the first modulated optical signal 44 which are outside of the narrow band of frequencies which represent the first resonance frequency. These reflected portions are represented by reflected first optical signal 46. Processing circuitry 12 may generate the first error signal based on one or more parameters of the reflected first optical signal 46 in order to cause an entirety of modulated first optical signal 44 to pass through resonator 20. In other words, when the error signal is equal to zero, a magnitude of reflected first optical signal 46 is zero and an entirety of modulated first optical signal 44 passes through resonator 20.

In some examples, processing circuitry 12 is configured to generate a second error signal for output to second light-emitting device 32. In some examples, processing circuitry 12 generates the second error signal in order to cause second light-emitting device 32 to generate second optical signal 48' to include one or more frequency components corresponding to the second resonance frequency of resonator 20. Resonator 20 may reflect any portions of the second modulated optical signal 48 which are outside of the narrow band of frequencies which represent the second resonance frequency. These reflected portions are represented by reflected second optical signal 50. Processing circuitry 12 may generate the second error signal based on one or more parameters of the reflected second optical signal 50 in order to cause an entirety of modulated second optical signal 48 to pass through resonator 20. In other words, when the error signal is equal to zero, a magnitude of reflected second optical signal 50 is zero and an entirety of modulated second optical signal 48 passes through resonator 20.

In some examples, accelerometer system 10 may only allow the measurement of an acceleration along a single proof mass displacement axis, thus allowing accelerometer system 10 to measure acceleration along one Cartesian axis only. In some examples, the proof mass displacement axis of accelerometer system 10 is parallel to first direction 58 and parallel to second direction 60. For example, when proof mass 22 is "displaced" closer to resonator beam 20 along the proof mass displacement axis, this may cause a tension force to be applied to resonator beam 20 which in turn causes resonance frequency modes to shift proportional to the acceleration of proof mass 22. In some cases, to obtain an acceleration of an object relative to all three Cartesian axes, three accelerometer systems are placed on the object such that the proof mass displacement axes of the respective accelerometer systems are aligned to form an x-axis, a y-axis, and a z-axis of a Cartesian space. As such, readouts from each of the three accelerometer systems may be combined to determine a three-dimensional acceleration vector.

Accelerometer system 10 is configured to measure the acceleration of the object in real-time or near real-time. Since processing circuitry 12 determines one or more resonance frequencies of resonator beam 20 based on optical signals which travel at the speed of light, processing circuitry 12 may be configured to determine the acceleration of accelerometer system 10 within a very short latency period (e.g., less than one nanosecond (ns)). In other words, processing circuitry 12 may determine the acceleration of accelerometer system 10 at a time that is very close to a present time, such as a time less than one nanosecond preceding the present time.

It may be beneficial to track acceleration in real time or near real-time in order to determine a positional displacement of an object during a period of time. For example, accelerometer system 10 may be a part of an inertial navigation system (INS) for tracking a position of an object based, at least in part, on an acceleration of the object. Additionally, accelerometer system 10 may be located on or within the object such that accelerometer system 10 accelerates with the object. As such, when the object accelerates, accelerometer system 10 (including proof mass 22 and resonator beam 20) accelerates with the object. Since acceleration over time is a derivative of velocity over time, and velocity over time is a derivative of position over time, processing circuitry 12 may, in some cases, be configured to determine the position displacement of the object by performing a double integral of the acceleration of the object over the period of time. Determining a position of an object using accelerometer system 10 located on the object, and not using a navigation system separate from the object (e.g., a Global Positioning System (GPS)), may be referred to as "dead reckoning."

Figure 2:
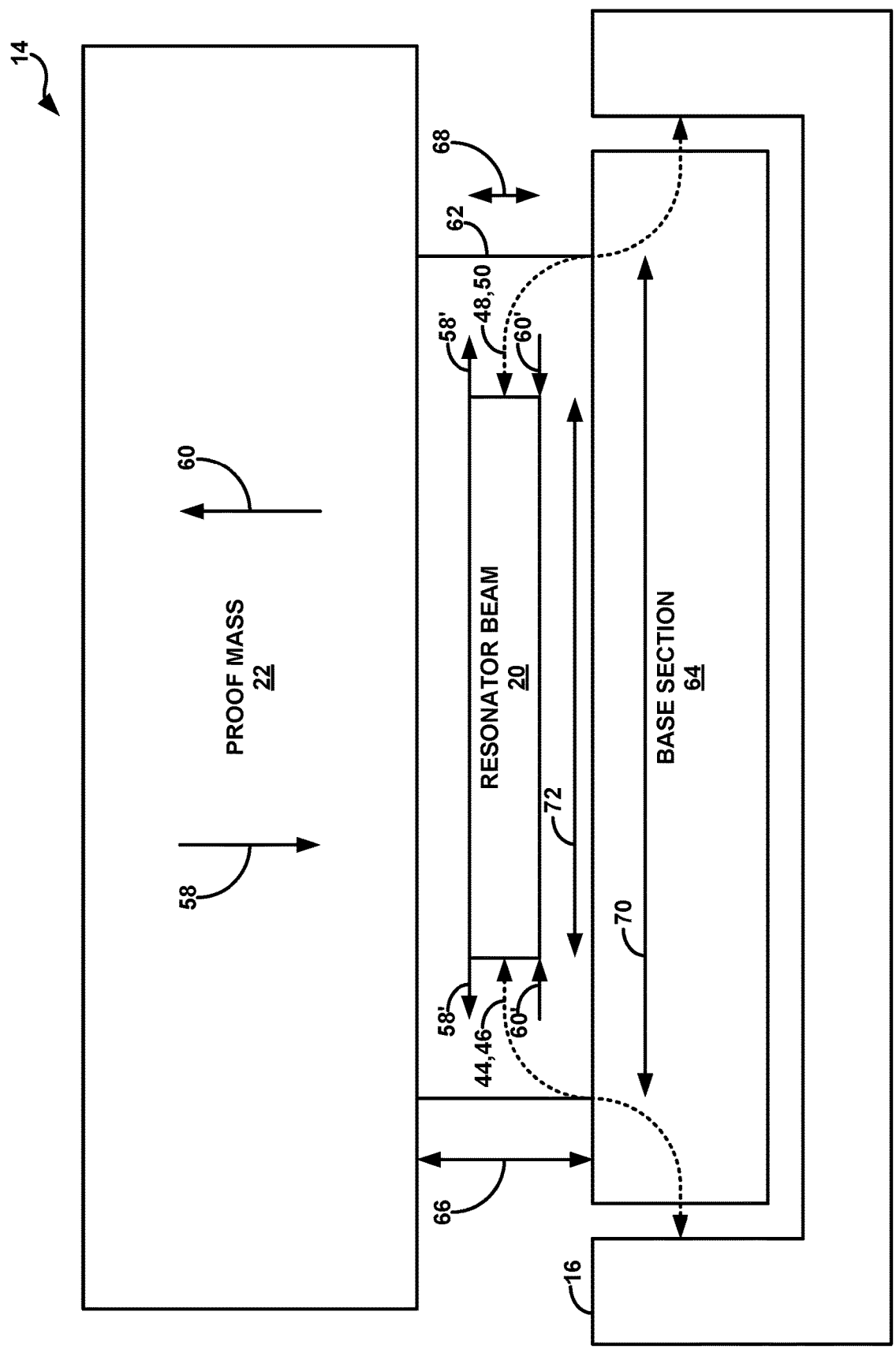
FIG. 2 is a block diagram illustrating a proof mass assembly and a circuit, in accordance with one or more techniques of this disclosure.

FIG. 2 is a block diagram illustrating a proof mass assembly 14 and a circuit 16, in accordance with one or more techniques of this disclosure. As seen in FIG. 2, proof mass assembly 14 includes proof mass 22, middle section 62, and base section 64. Resonator beam 20 may be located on, within, or otherwise in contact with middle section 62. Circuit 16 may represent an opto-electrical circuit configured to emit one or more optical signals to proof mass assembly 14. In some examples, circuit 16 includes processing circuitry 12, first light-emitting device 24, first circulator 26, photoreceiver 28, second light-emitting device 32, and second circulator 34 of FIG. 1.

In some examples, proof mass 22 is mechanically connected to middle section 62, and middle section 62 is mechanically connected to base section 64. Proof mass 22 may apply one or both of compression forces and tension forces to resonator beam 20 by nature of being mechanically connected to middle section 62. For example, when proof mass assembly 14 accelerates in the first direction 58, proof mass 22 may exert a downwards force on a top end of middle section 62, causing a width 66 of middle section 62 to decrease (e.g., compress) and causing a length 70 of middle section 62 to increase (e.g., stretch). Since resonator beam 20 is connected to middle section 62, the decrease in the width 66 of middle section 62 causes a decrease in a width 68 of resonator beam 20 and the increase in the length 70 of middle section 62 causes an increase in a length 72 of resonator beam 20. For example, the increase in the length 70 of middle section 62 applies tension force 58' to resonator beam 20, resulting in the increase in the length 72 of resonator beam 20.

Additionally, in some cases, when proof mass assembly 14 accelerates in the second direction 60, proof mass 22 may exert an upwards force on a top end of middle section 62, causing the width 66 of middle section 62 to increase (e.g., stretch) and causing the length 70 of middle section 62 to decrease (e.g., compress). Since resonator beam 20 is connected to middle section 62, the increase in the width 66 of middle section 62 causes an increase in a width 68 of resonator beam 20 and the decrease in the length 70 of middle section 62 causes a decrease in a length 72 of resonator beam 20. For example, the decrease in the length 70 of middle section 62 applies compression force 60' to resonator beam 20, resulting in the decrease in the length 72 of resonator beam 20.

An increase in the length 72 of resonator beam 20 caused by tension force 58' or a decrease in the length 72 of resonator beam 20 caused by compression force 60' may affect one or more resonance frequency modes of resonator beam 20 which are induced by optical signals delivered to resonator beam 20 by circuit 16. For example, first optical signal 44 may include TE light which induces a mechanical vibration of resonator beam 20 according to a TE resonance frequency mode. Additionally, or alternatively, second optical signal 48 may include TM light which induces a mechanical vibration of resonator beam 20 according to a TM resonance frequency mode. The TE resonance frequency mode may represent a frequency distribution having one or more characteristics including a TE resonance frequency value and the TM resonance frequency mode may represent a frequency distribution having one or more characteristics including a TM resonance frequency value.

In one or more examples where tension force 58' is applied to resonator beam 20 causing the length 72 of resonator beam 20 to increase, the TE resonance frequency value of resonator beam 20 and the TM resonance frequency value of resonator beam 20 may change in opposite directions. That is, in some cases, the TE resonance frequency value may increase while the TM resonance frequency decreases or the TE resonance frequency value decreases while the TM resonance frequency increases responsive to the application of tension force 58'. Similarly, in one or more examples where compression force 60' is applied to resonator beam 20 causing the length 72 of resonator beam 20 to decrease, the TE resonance frequency value of resonator beam 20 and the TM resonance frequency value of resonator beam 20 may change in opposite directions. That is, in some cases, the TE resonance frequency value may increase while the TM resonance frequency decreases or the TE resonance frequency value decreases while the TM resonance frequency increases responsive to the application of compression force 60'.

A difference between the TE resonance frequency value and the TM resonance frequency value may be correlated with a magnitude of an acceleration of proof mass assembly 14. For example, if a first difference between a first TE resonance frequency value and a first TM resonance frequency value corresponds to a first acceleration value and a second difference between a second TE resonance frequency value and a second TM resonance frequency value corresponds to a second acceleration value, the first acceleration may be greater than the second acceleration when the first difference is greater than the second difference.

In some examples, processing circuitry (e.g., processing circuitry 12 of FIG. 1) may determine a sign (e.g., positive or negative) of the acceleration of proof mass assembly 14 based on comparing the TE resonance frequency value with the TM resonance frequency value. In some cases, the TE resonance frequency value increases and the TM resonance frequency value decreases responsive to a positive acceleration (e.g., acceleration in direction 58) of proof mass assembly 14, where the TE resonance frequency value and the TM resonance frequency value are nearly the same while acceleration is zero. Additionally, in some cases, the TE resonance frequency value may decrease, and the TM resonance frequency value may increase responsive to a negative acceleration (e.g., acceleration in direction 60) of proof mass assembly 14.

In at least some such cases, processing circuitry 12 may determine that the acceleration of proof mass assembly 14 is positive in response to determining that the TE resonance frequency value is greater than the TM resonance frequency value. By the same token, processing circuitry 12 may determine that the acceleration of proof mass assembly 14 is negative in response to determining that the TE resonance frequency value is less than the TM resonance frequency value.

To fabricate proof mass assembly 14, it may be beneficial to deposit a first thickness of a low-index dielectric material on a wafer of material, and deposit a second thickness of a second, high-index material on the waver. It may be possible fabricate a waveguide using lithography and etching techniques and create a linear resonator beam 20 using high-index material. Subsequently, it may be possible to then clad the waveguide and the resonator beam 20 with a second layer of the low-index dielectric material. A second conventional lithography and etching process may release proof mass 22 and the anchor (e.g., base section 64) from a substrate. In some examples, proof mass assembly 14 may include conventional fabrication of a microheater above resonator beam 20 to stabilize the accelerometer with respect to temperature.

Figure 3:
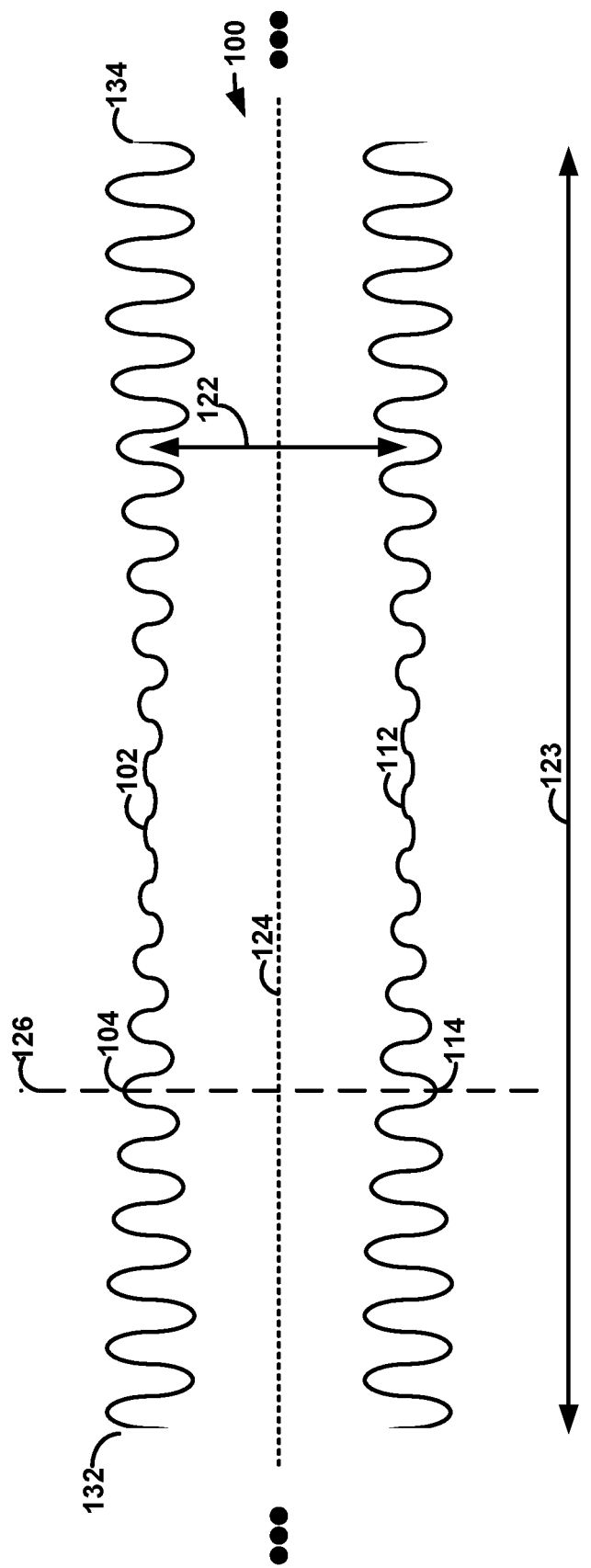
FIG. 3 is a conceptual diagram illustrating a resonator beam, in accordance with one or more techniques of this disclosure.

FIG. 3 is a conceptual diagram illustrating a resonator beam 100, in accordance with one or more techniques of this disclosure. In some examples, resonator beam 100 is an example of resonator beam 20 of FIGS. 1 and 2. As illustrated in FIG. 3, resonator beam 100 includes a first oscillating edge 102 including a peak 104 and a second oscillating edge 112 including a valley 114. Resonator beam 100 may extend along a longitudinal axis 124 from a first end 132 to a second end 134. In some examples, resonator beam 100 may receive one or more optical signals at first end 132 from a first circulator (e.g., first circulator 26 of FIG. 1) and resonator beam 100 may receive one or more optical signals at second end 134 from a second circulator (e.g., second circulator 34 of FIG. 1).

In some examples, one or more sinusoidal functions may represent each of first oscillating edge 102 and second oscillating edge 112 (collectively, "oscillating edges 102, 112"). In this way, each of oscillating edges 102, 112 may resemble an oscillating pattern. Additionally, in some examples, one or more other functions (e.g., square functions, triangle functions, exponential functions, linear functions, polynomial functions, quadratic functions, or any combination thereof) may represent each of oscillating edges 102, 112. The one or more functions may be continuous (e.g., analog) or discrete (e.g., digital) in nature.

In some examples, resonator beam 20 may act as a reflective waveguide, allowing optical signals within one or more frequency bands to propagate through resonator beam 20, and "reflecting" optical signals within one or more other frequency bands. Oscillating edges 102, 112 may define the optical frequency bands which resonator beam 20 reflects and the frequency bands which resonator beam 20 allows to pass. For example, the first oscillating edge 102 may cause the resonator beam 100 to be associated with a first spatial frequency and the second oscillating edge 112 may cause the resonator beam 100 to be associated with a second spatial frequency, where the first spatial frequency and the second spatial frequency represent a first resonance frequency and a second resonance frequency, respectively. In some examples, the first resonance frequency may represent a resonance frequency of resonator beam 100 induced by a first light mode (e.g., the TE light mode) and the second resonance frequency may represent a resonance frequency of resonator beam 100 induced by a second light mode (e.g., the TM light mode).

In some examples, a pi phase shift may exist between the oscillation pattern of first oscillating edge 102 and the oscillation pattern of second oscillating edge 112 relative to longitudinal axis 124. For example, peak 104 of first oscillating edge 102 may be located at the same position 126 along longitudinal axis 124 as valley 114 of second oscillating edge 112. In some cases, each peak of first oscillating edge 102 may be aligned with a respective valley of second oscillating edge 112 along longitudinal axis 124. Since resonator beam 100 includes this pi phase shift, resonator beam 100 may allow a first band of frequencies of a first modulated optical signal to propagate along the length of resonator beam 100 from first end 132 to second end 134 and allow a second band of frequencies of a second modulated optical signal to propagate along the length of resonator beam 100 from second end 134 to second end 132. Resonator beam 20 may reflect frequencies of the first modulated optical signal that are outside of the first frequency band back out of first end 132 and reflect frequencies of the second modulated optical signal that are outside of the second frequency band back out of second end 134.

The portion of the first modulated optical signal which passes through resonator beam 20 may indicate the first resonance frequency and the portion of the second modulated optical signal which passes through resonator beam 20 may indicate the second resonance frequency. As such, the first resonance frequency and the second resonance frequency may be identified based on frequencies that are present in the respective passed modulated optical signals.

In some examples, a compression force or a tension force applied to ends 132, 134 of resonator beam 100 may affect the first resonance frequency and the second resonance frequency of resonator beam 100. A proof mass assembly (e.g., proof mass assembly 14 of FIG. 2) may apply these respective compression forces or tension forces responsive to an acceleration of the proof mass assembly. In some cases, a magnitude of a difference between the first resonance frequency and the second resonance frequency caused by the force applied to ends 132, 134 indicates the magnitude of the acceleration of the proof mass assembly.

The width 122 of resonator beam 100 may be within a range from 200 nanometers (nm) to 700 nm (e.g., 500 nm), but this is not required. The width 122 of resonator beam 100 may include any width or range of widths. In some examples, a length 123 of resonator beam 100 may be within a range from 1 millimeter (mm) to 5 mm, but this is not required. The length 123 of resonator beam 100 may include any length or range of lengths.

Resonator beam 100 is not meant to be limited to the oscillating pattern of first oscillating edge 102 and the oscillating pattern of second oscillating edge 112 which are illustrated in FIG. 3. First oscillating edge 102 may include more periods than are illustrated in FIG. 3 or less periods than are illustrated in FIG. 3 in some cases. Additionally, or alternatively, second oscillating edge 112 may include more periods than are illustrated in FIG. 3 or less periods than are illustrated in FIG. 3 in some cases.

Figure 4:
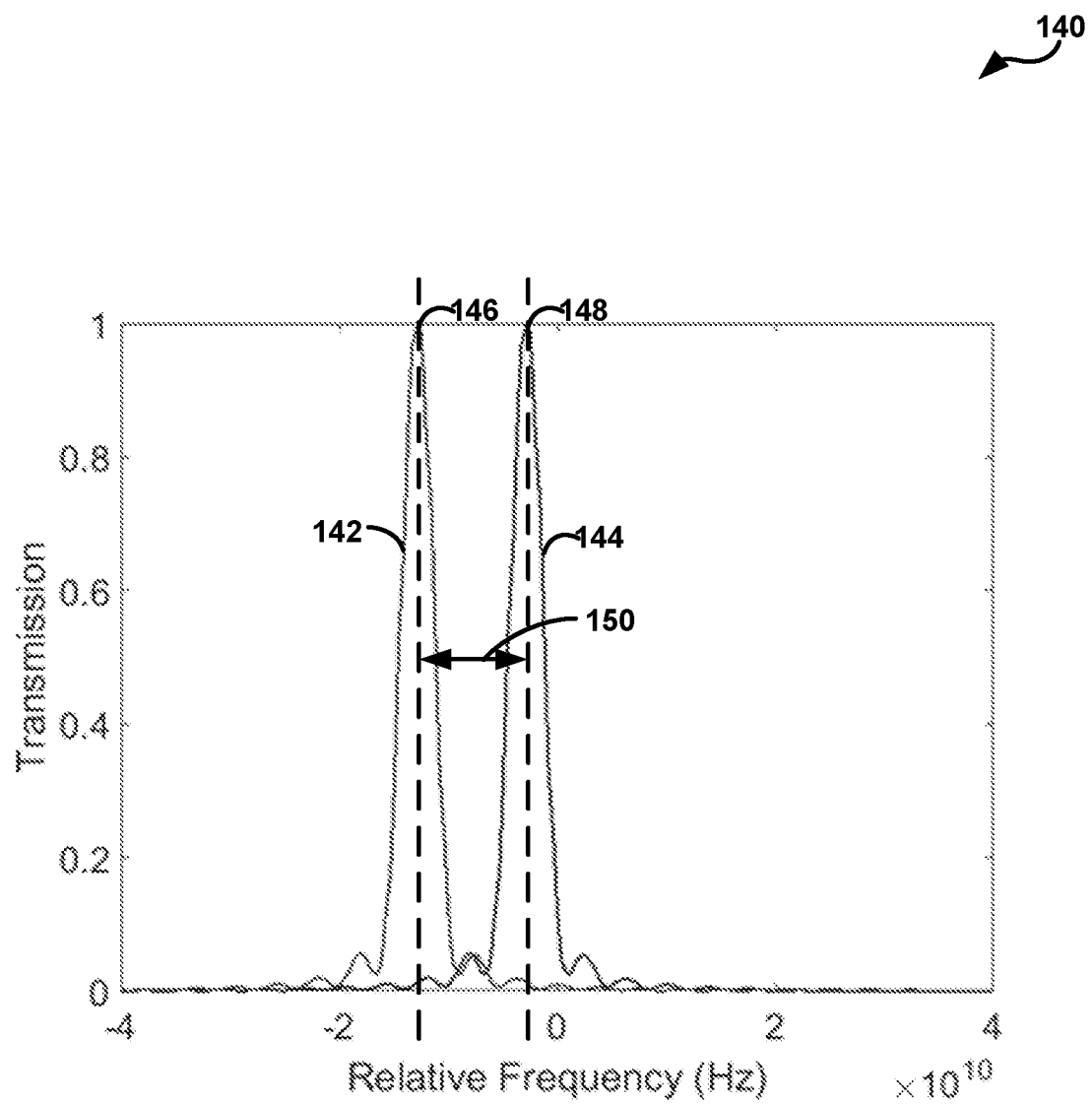
FIG. 4 is a graph illustrating a first frequency plot and a second frequency plot, in accordance with one or more techniques of this disclosure.

FIG. 4 is a graph illustrating a first frequency plot 142 and a second frequency plot 144, in accordance with one or more techniques of this disclosure. As seen in FIG. 4, first frequency plot 142 includes a first peak frequency 146 and second frequency plot 144 includes a second peak frequency 148. First peak frequency 146 and second peak frequency 148 are separated by a frequency difference value 150.

In some examples, the first frequency plot 142 includes one or more frequency components of the modulated first optical signal 44 which is delivered to the first end 52 of resonator beam 20. First frequency plot 142 may represent a distribution of frequencies which propagate through resonator beam 20 from first end 52 to second end 54. Since photoreceiver 28 receives the passed first optical signal 45 which includes frequency components passed by resonator beam 20, the first frequency plot 142 may represent one or more frequency components which are present in the passed first optical signal 45. In some examples, the first peak frequency 146 may represent a first resonance frequency in which resonator beam 20 mechanically vibrates.

In some examples, the second frequency plot 144 includes one or more frequency components of the modulated second optical signal 48 which is delivered to the second end 54 of resonator beam 20. Second frequency plot 144 may represent a distribution of frequencies which propagate through resonator beam 20 from second end 54 to first end 52. Since photoreceiver 28 receives the passed second optical signal 49 which includes frequency components passed by resonator beam 20, the second frequency plot 144 may represent one or more frequency components which are present in the passed second optical signal 49. In some examples, the second peak frequency 148 represents a second resonance frequency in which resonator beam 20 mechanically vibrates.

Processing circuitry 12 of FIG. 1 may be configured to determine an acceleration of accelerometer system 10 based on the frequency difference value 150, which represents a difference between the first peak frequency 146 and the second peak frequency 148. In some examples, a linear or near-linear relationship may exist between a magnitude of the acceleration of accelerometer system 10 and a magnitude of the difference between the first peak frequency 146 and the second peak frequency 148. For example, if the acceleration increases, the frequency difference value 150 may also increase by a similar proportion and if the acceleration decreases, the frequency difference value 150 may also decrease.

In some examples, the first frequency plot 142 may represent one or more frequencies of TE light and the second frequency plot 144 may represent one or more frequencies of TM light, but this is not required. In some examples, the first frequency plot 142 and the second frequency plot 144 may be associated with other types of light. The first resonance frequency may represent a frequency in which resonator beam 20 vibrates according to a TE resonance frequency mode and the second resonance frequency may represent a frequency in which resonator beam 20 vibrates according to a TM resonance frequency mode.

Figure 5:
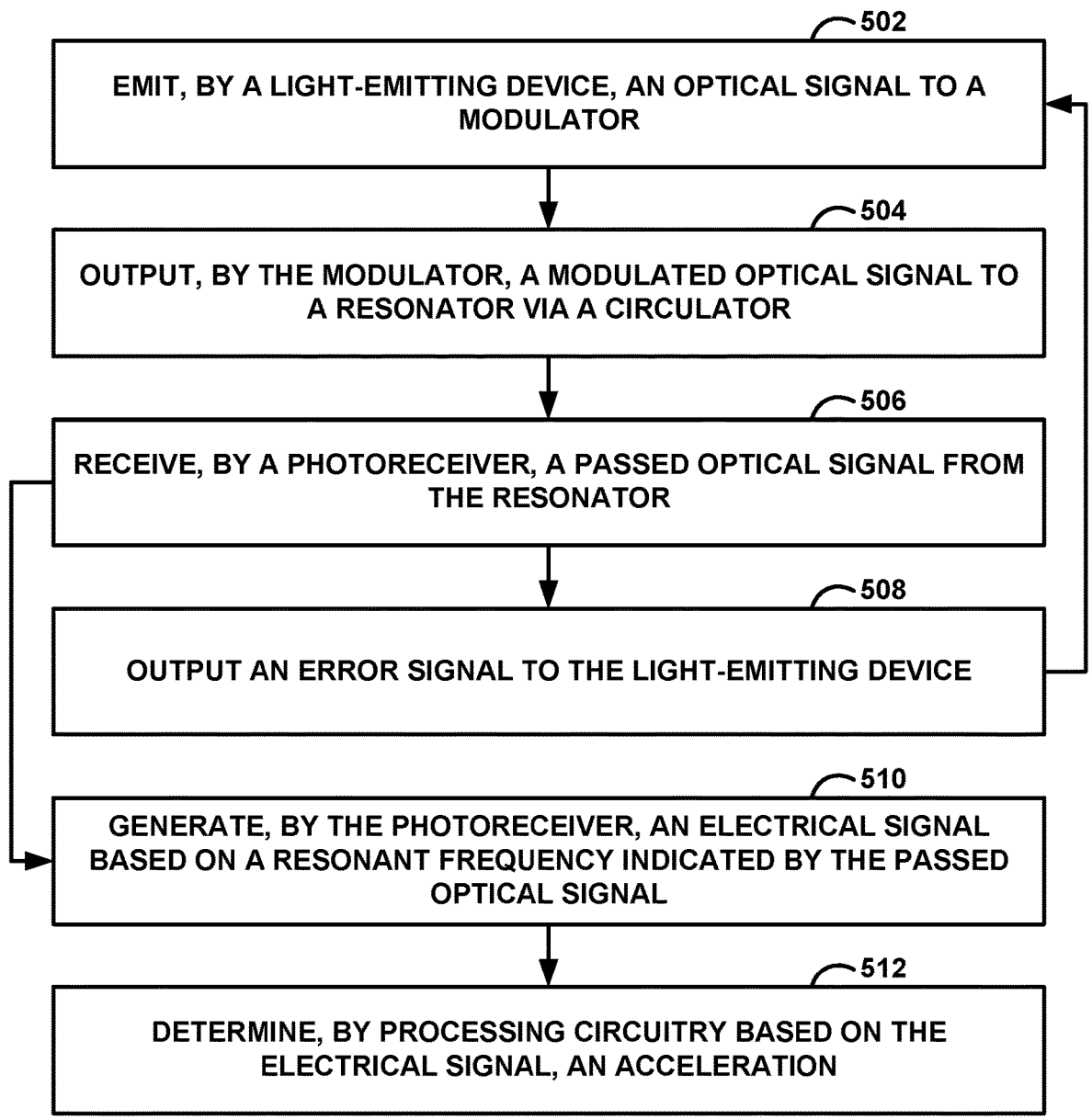
FIG. 5 is a flow diagram illustrating an example operation for determining an acceleration using an opto-mechanical resonator beam, in accordance with one or more techniques of this disclosure.

FIG. 5 is a flow diagram illustrating an example operation for determining an acceleration using an opto-mechanical resonator beam, in accordance with one or more techniques of this disclosure. FIG. 5 is described with respect to accelerometer system 10, proof mass assembly 14, circuit 16, and resonator beam 100 of FIGS. 1-4. However, the techniques of FIG. 5 may be performed by different components of accelerometer system 10, proof mass assembly 14, circuit 16, and resonator beam 100 or by additional or alternative devices.

In some examples, processing circuitry 12 may be configured to determine an acceleration of accelerometer system 10. In some examples, the accelerometer system 10 may include a resonator beam 20 which is configured to mechanically vibrate according to a first resonance frequency and a second resonance frequency. For example, resonator beam 20 may represent an opto-mechanical resonator beam configured to act as an optical waveguide for two or more types of light (e.g., TE light and TM light). Processing circuitry 12 may determine acceleration based on a difference between the first resonance frequency and the second resonance frequency.

First light-emitting device 24 may emit a first optical signal 44' to first modulator 25 (502). In some examples, first modulator 25 may generate a modulated first optical signal 44 to include TE light in order to induce a mechanical vibration in resonator beam 20 according to a TE resonance frequency mode. First modulator 25 may output the modulated first optical signal 44 to resonator 20 via first circulator 26 (504). In other words, first circulator 26 directs the modulated first optical signal 44 to a first end 52 of resonator beam 20 via one or more optical fibers. A portion of the modulated first optical signal 44 may travel through resonator 20 form first end 52 to second end 54. This portion of the modulated first optical signal 44 may include a band of frequencies which corresponds to a resonance frequency of resonator 20. Photoreceiver 28 may receive passed first optical signal 45 from resonator beam 20 (506) via a second circulator 34. In some examples, the passed first optical signal 45 may include one or more frequency components of modulated first optical signal 44 which are passed by resonator beam 20 which correspond to the resonance frequency.

In some examples, processing circuitry 12 may generate an error signal. The error signal may reflect any detectable difference between the modulated first optical signal 44 and the passed first optical signal 45. For example, first light-emitting device 24 may emit first optical signal 44' to include frequency components representative of the first resonance frequency of resonator 20. Any frequency components of the first optical signal 44' may be reflected by resonator beam 20. Photoreceiver 28 may receive the reflected first optical signal 46 and processing circuitry 12 may generate the error signal based on the reflected first optical signal 46. Processing circuitry 12 outputs the error signal to first light-emitting device 24 (508) in order to control first light-emitting device 24 to generate first optical signal 44' such that first optical signal 44' does not include frequencies outside of the first resonance frequency.

In response to receiving the passed first optical signal 45, photoreceiver 28 generates an electrical signal based on the first resonant frequency of resonator beam 20 (510), which is indicated by the passed first optical signal 45 received by photoreceiver 48. Photoreceiver 28 outputs the electrical signal to processing circuitry 12. Processing circuitry 12 may determine the acceleration of accelerometer system 10 based on the electrical signal (512).

In some examples, accelerometer system 10 includes a second feedback loop which delivers another optical signal to photoreceiver 28, the other optical signal indicating the second resonance frequency of resonator beam 20. Processing circuitry 12 may determine the acceleration based on the difference between the first resonance frequency and the second resonance frequency.

In one or more examples, the accelerometers described herein may utilize hardware, software, firmware, or any combination thereof for achieving the functions described. Those functions implemented in software may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure.

Instructions may be executed by one or more processors within the accelerometer or communicatively coupled to the accelerometer. The one or more processors may, for example, include one or more DSPs, general purpose microprocessors, application specific integrated circuits ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for performing the techniques described herein. Also, the techniques could be fully implemented in one or more circuits or logic elements.

The techniques of this disclosure may be implemented in a wide variety of devices or apparatuses that include integrated circuits (ICs) or sets of ICs (e.g., chip sets). Various components, modules, or units are described in this disclosure to emphasize functional aspects of devices configured to perform the disclosed techniques, but do not necessarily require realization by different hardware units. Rather, various units may be combined or provided by a collection of interoperative hardware units, including one or more processors as described above, in conjunction with suitable software and/or firmware.

What is claimed is:

1. An accelerometer system comprising:
   a resonator beam comprising a mechanical beam extending along a longitudinal axis from a first end to a second end, wherein the mechanical beam includes:
      a first oscillating surface which extends along the longitudinal axis from the first end to the second end, wherein the first oscillating surface is represented by a first sinusoidal pattern; and
      a second oscillating surface opposite the first oscillating surface, wherein the second oscillating surface extends along the longitudinal axis from the first end to the second end, wherein the second oscillating surface is represented by a second sinusoidal pattern;
   a proof mass;
   a light-emitting device configured to generate, based on an error signal, an optical signal;
   a modulator configured to:
      receive the optical signal;
      generate a modulated optical signal responsive to receiving the optical signal; and
      output the modulated optical signal to the resonator beam;
   a photoreceiver configured to:
      receive a passed optical signal from the resonator beam, wherein the passed optical signal represents a portion of the modulated optical signal which passes through the resonator beam, the passed optical signal indicating a resonance frequency of the resonator beam;
      receive a reflected optical signal from the resonator beam, wherein the reflected optical signal represents a portion of the modulated optical signal which is reflected by the resonator beam, wherein the first oscillating surface and the second oscillating surface define one or more frequency bands that are reflected by the resonator beam as part of the reflected optical signal, and wherein the first oscillating surface and the second oscillating surface define one or more frequency bands that are passed by the resonator beam as part of the passed optical signal; and
      generate one or more electrical signals based on the passed optical signal and the reflected optical signal; and
   processing circuitry configured to:
      generate the error signal based on one or more parameters of the reflected optical signal which are indicated by the one or more electrical signals; and
      determine an acceleration based on the resonance frequency which is indicated by the one or more electrical signals,
   wherein the proof mass is configured to:
      apply a force to the resonator beam responsive to the acceleration, wherein the force causes the resonator beam to vibrate at the resonance frequency, wherein the force is perpendicular to the longitudinal axis of the resonator beam, and
   wherein the force causes a length of the resonator beam to:
      increase along the longitudinal axis; or
      decrease along the longitudinal axis.

2. The accelerometer system of claim 1, wherein the light-emitting device is a first light-emitting device, wherein the error signal is a first error signal, wherein the optical signal is a first optical signal, wherein the modulator is a first modulator, wherein the modulated optical signal is a first modulated optical signal, wherein the passed optical signal is a passed first optical signal, wherein the reflected optical signal is a reflected first optical signal, wherein the resonance frequency is a first resonance frequency, and wherein the accelerometer system further comprises:
   a second light-emitting device configured to generate, based on a second error signal, a second optical signal;
   a second modulator configured to:
      receive the second optical signal;
      generate a modulated second optical signal responsive to receiving the second optical signal; and
      output the modulated second optical signal to the resonator beam,
   wherein the photoreceiver is further configured to:
      receive a passed second optical signal from the resonator beam, wherein the passed second optical signal represents a portion of the modulated second optical signal which passes through the resonator beam, the passed second optical signal indicating a second resonance frequency of the resonator beam;
      receive a reflected second optical signal from the resonator beam, wherein the reflected second optical signal represents a portion of the modulated second optical signal which is reflected by the resonator beam; and
      generate the one or more electrical signals based on the passed second optical signal and the reflected second optical signal, and
   wherein the processing circuitry is further configured to:
      generate the second error signal based on one or more parameters of the reflected second optical signal which are indicated by the one or more electrical signals; and determine the acceleration based on the first resonance frequency and the second resonance frequency which are indicated by the one or more electrical signals.

3. The accelerometer system of claim 2, wherein the photoreceiver generates the one or more electrical signals to reflect a difference between the first resonance frequency and the second resonance frequency, and wherein the processing circuitry is configured to determine the acceleration based on the difference between the first resonance frequency and the second resonance frequency.

4. The accelerometer system of claim 2, wherein the first modulator is configured to emit the modulated first optical signal to a first end of the resonator beam, and wherein the second modulator is configured to emit the modulated second optical signal to a second end of the resonator beam.

5. The accelerometer system of claim 2,
wherein the first oscillating surface causes the mechanical beam to vibrate at the first resonance frequency, and
wherein the second oscillating surface causes the mechanical beam to vibrate at the second resonance frequency.

6. The accelerometer system of claim 5, wherein a first oscillation pattern of the first oscillation surface is offset from a second oscillation pattern of the second oscillating surface along the longitudinal axis such that one or more peaks of the first oscillation pattern align with one or more valleys of the second oscillation pattern.

7. The accelerometer system of claim 6, wherein an amplitude of the first oscillation pattern decreases along the longitudinal axis from the first end to a center of the mechanical beam, wherein the amplitude of the first oscillation pattern increases along the longitudinal axis from the center of the mechanical beam to the second end, wherein an amplitude of the second oscillation pattern decreases along the longitudinal axis from the first end to the center of the mechanical beam, and wherein the amplitude of the second oscillation pattern increases along the longitudinal axis from the center of the mechanical beam to the second end.

8. The accelerometer system of claim 1, wherein the resonance frequency is a first resonance frequency, wherein the acceleration is a first acceleration, wherein the force is a first force, and wherein the proof mass is configured to:
apply, responsive to a second acceleration of the accelerometer system in a second direction, a second force to the resonator beam, causing the resonator beam to vibrate at a second resonance frequency,
wherein the first direction represents a positive direction along an axis which is normal to a longitudinal axis of the resonator beam, and
wherein the second direction represents a negative direction along the axis which is normal to the longitudinal axis of the resonator beam.

9. The accelerometer system of claim 1, wherein to generate the optical signal based on the error signal, the light-emitting device is configured to generate the optical signal to include a band of frequencies corresponding to the resonance frequency.

10. A method comprising:
generating, by a light-emitting device based on an error signal, an optical signal;
receiving, by a modulator, the optical signal;
generating, by the modulator, a modulated optical signal responsive to receiving the optical signal;
outputting, by the modulator, the modulated optical signal to a resonator beam comprising a mechanical beam extending along a longitudinal axis from a first end to a second end, wherein the mechanical beam includes:
a first oscillating surface which extends along the longitudinal axis from the first end to the second end, wherein the first oscillating surface is represented by a first sinusoidal pattern; and
a second oscillating surface opposite the first oscillating surface, wherein the second oscillating surface extends along the longitudinal axis from the first end to the second end, wherein the second oscillating surface is represented by a second sinusoidal pattern;
receiving, by a photoreceiver, a passed optical signal from the resonator beam, wherein the passed optical signal represents a portion of the modulated optical signal which passes through the resonator beam, the passed optical signal indicating a resonance frequency of the resonator beam;
receiving, by the photoreceiver, a reflected optical signal from the resonator beam, wherein the reflected optical signal represents a portion of the modulated optical signal which is reflected by the resonator beam, wherein the first oscillating surface and the second oscillating surface define one or more frequency bands that are reflected by the resonator beam as part of the reflected optical signal, and wherein the first oscillating surface and the second oscillating surface define one or more frequency bands that are passed by the resonator beam as part of the passed optical signal;
generating, by the photoreceiver, one or more electrical signals based on the passed optical signal and the reflected optical signal;
generating, by processing circuitry, the error signal based on one or more parameters of the reflected optical signal which are indicated by the one or more electrical signals;
determining, by the processing circuitry, the acceleration based on the resonance frequency which is indicated by the one or more electrical signals; and
applying, by a proof mass, a force to the resonator beam responsive to the acceleration, wherein the force causes the resonator beam to vibrate at the resonance frequency, wherein the force is perpendicular to the longitudinal axis of the resonator beam, and
wherein the force causes a length of the resonator beam to:
increase along the longitudinal axis; or
decrease along the longitudinal axis.

11. The method of claim 10, wherein the light-emitting device is a first light-emitting device, wherein the error signal is a first error signal, wherein the optical signal is a first optical signal, wherein the modulator is a first modulator, wherein the modulated optical signal is a first modulated optical signal, wherein the passed optical signal is a passed first optical signal, wherein the reflected optical signal is a reflected first optical signal, wherein the resonance frequency is a first resonance frequency, and wherein the method further comprises:
generating, by a second light-emitting device based on a second error signal, a second optical signal;
receiving, by a second modulator, the second optical signal;
generating, by the second modulator, a modulated second optical signal responsive to receiving the second optical signal;
outputting, by the second modulator, the modulated second optical signal to the resonator beam;

receiving, by the photoreceiver, a passed second optical signal from the resonator beam, wherein the passed second optical signal represents a portion of the modulated second optical signal which passes through the resonator beam, the passed second optical signal indicating a second resonance frequency of the resonator beam;

receiving, by the photoreceiver, a reflected second optical signal from the resonator beam, wherein the reflected second optical signal represents a portion of the modulated second optical signal which is reflected by the resonator beam;

generating, by the photoreceiver, the one or more electrical signals based on the passed second optical signal and the reflected second optical signal, generating, by the processing circuitry, the second error signal based on one or more parameters of the reflected second optical signal which are indicated by the one or more electrical signals; and determining, by the processing circuitry, the acceleration based on the first resonance frequency and the second resonance frequency which are indicated by the one or more electrical signals.

12. The method of claim 11, further comprising:

generating the one or more electrical signals to reflect a difference between the first resonance frequency and the second resonance frequency; and determining the acceleration based on the difference between the first resonance frequency and the second resonance frequency.

13. The method of claim 11, further comprising:

emitting, by the first modulator, the modulated first optical signal to a first end of the resonator beam; and emitting, by the second modulator, the modulated second optical signal to a second end of the resonator beam.

14. The method of claim 11, wherein the first oscillating surface causes the mechanical beam to vibrate at the first resonance frequency, and wherein the second oscillating surface causes the mechanical beam to vibrate at the second resonance frequency.

15. The method of claim 14, wherein a first oscillation pattern of the first oscillation surface is offset from a second oscillation pattern of the second oscillation surface along the longitudinal axis such that one or more peaks of the first oscillation pattern align with one or more valleys of the second oscillation pattern.

16. The method of claim 15, wherein an amplitude of the first oscillation pattern decreases along the longitudinal axis from the first end to a center of the mechanical beam, wherein the amplitude of the first oscillation pattern increases along the longitudinal axis from the center of the mechanical beam to the second end, wherein an amplitude of the second oscillation pattern decreases along the longitudinal axis from the first end to the center of the mechanical beam, and wherein the amplitude of the second oscillation pattern increases along the longitudinal axis from the center of the mechanical beam to the second end.

17. The method of claim 10, wherein the resonance frequency is a first resonance frequency, wherein the acceleration is a first acceleration, wherein the force is a first force, and wherein the method further comprises:

applying, by the proof mass responsive to a second acceleration of the accelerometer system in a second direction, a second force to the resonator beam, causing the resonator beam to vibrate at a second resonance frequency ncy, wherein the first direction represents a positive direction along an axis which is normal to a longitudinal axis of the resonator beam, and wherein the second direction represents a negative direction along the axis which is normal to the longitudinal axis of the resonator beam.

* * * * *